INVENTOR.
ALFRED E. STURZENEGGER
BY Hudson, Boughton,
Williams, David & Hoffman
ATTORNEYS Dec. 5, 1961 A. E. STURZENEGGER 3,012,160
ELECTROMAGNETIC COUPLING
Filed May 1, 1959 4 Sheets-Sheet 4

INVENTOR.
ALFRED E. STURZENEGGER
BY Hudson, Boughton,
Williams, David & Hoffmann
ATTORNEYS

United States Patent Office 3,012,160
Patented Dec. 5, 1961

3,012,160
ELECTROMAGNETIC COUPLING
Alfred E. Sturzenegger, Kenosha, Wis., assignor to Eaton Manufacturing Company, Cleveland, Ohio, a corporation of Ohio
Filed May 1, 1959, Ser. No. 810,361
9 Claims. (Cl. 310—105)

This invention relates to electromagnetic couplings and, as one of its objects, aims to provide a very practical and efficient form of such a coupling which can be used to advantage in motor-drive coupling units and in various other power transmission applications.

Another object is to provide a novel construction for an electromagnetic coupling of the kind having interdigitated pole members and an inductor drum in association therewith, and wherein the construction and relationship of the component parts results in a compact assembly in which only a minimum amount of power will be lost in the generation of heat and whose operating temperature can be maintained within a desirable range by a highly effective cooling means.

A further object is to provide an electromagnetic coupling of the interdigitated-pole type wherein the inductor drum is of a relatively short axial length for compactness and reduced heat generation and carries heat dissipating means, preferably in the form of a bladed air-impelling means, made of metal having a higher coefficient of heat conductivity than the drum itself.

Still another object is to provide a novel electromagnetic coupling of the character mentioned above and having an annular field coil supported by an annular field member located on one axial side of such coil, and wherein one group of the interdigitated pole members comprises outer radial end portions of radiating arms lying wholly on the other axial side of the coil.

Figure 1:
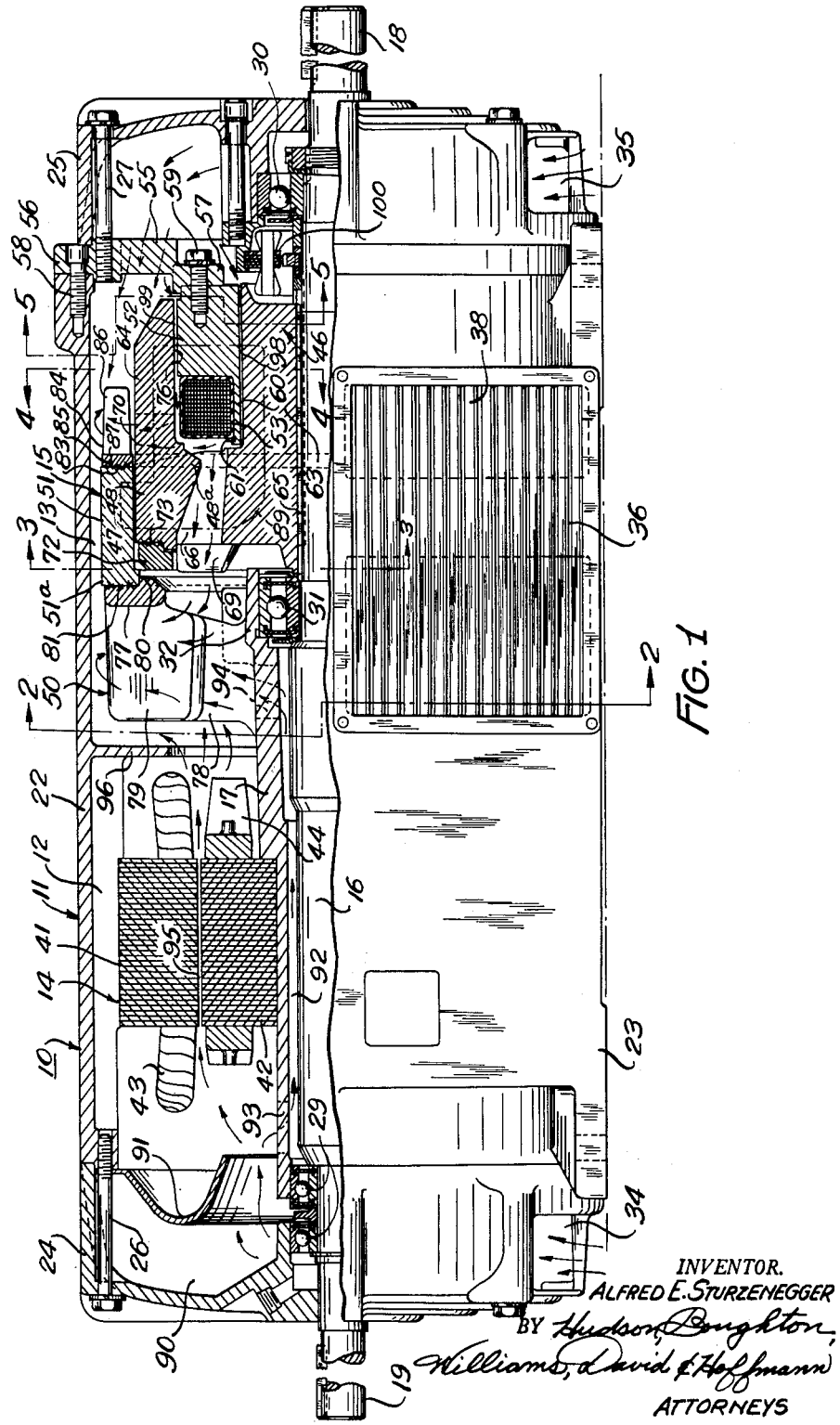
Figure 2:
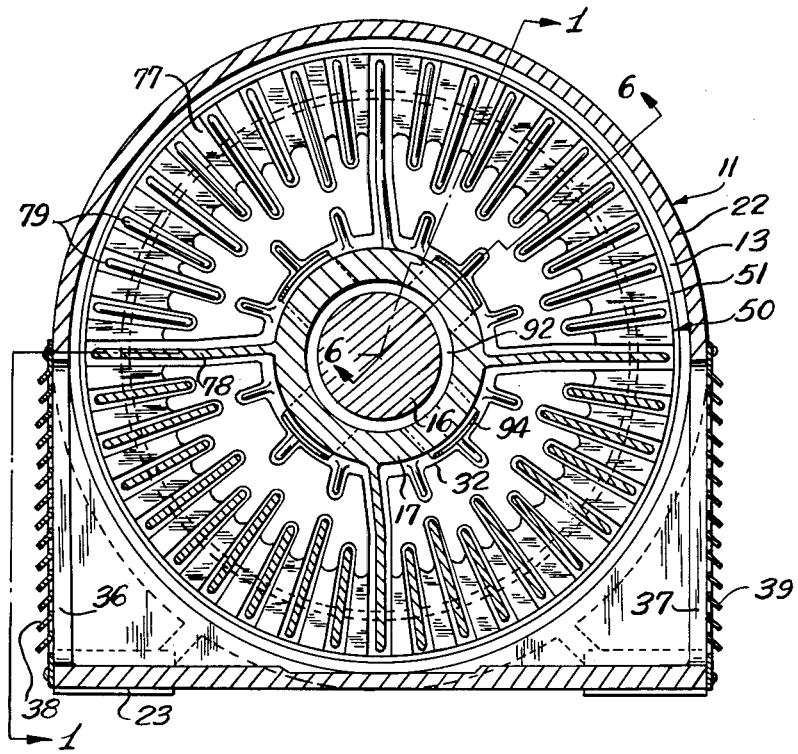
Figure 3:
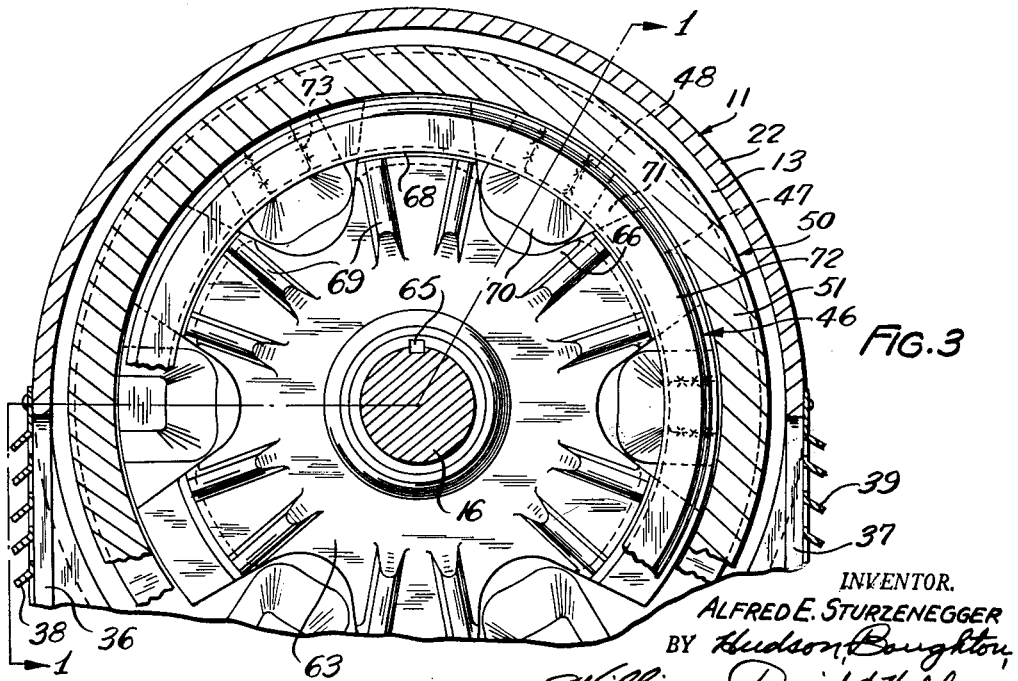
Figure 4:
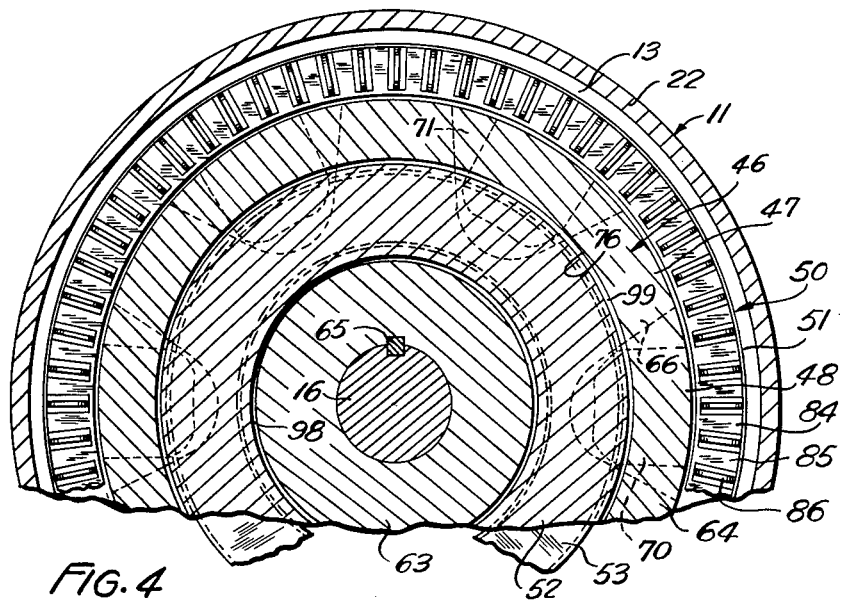
Figure 5:
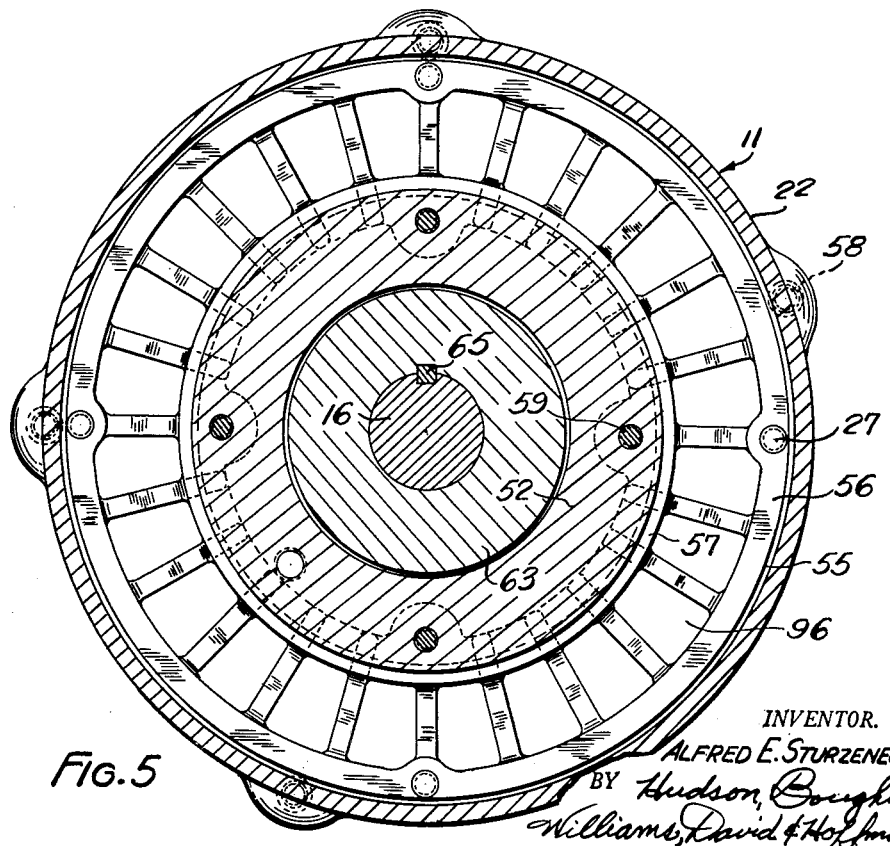
Figure 6:
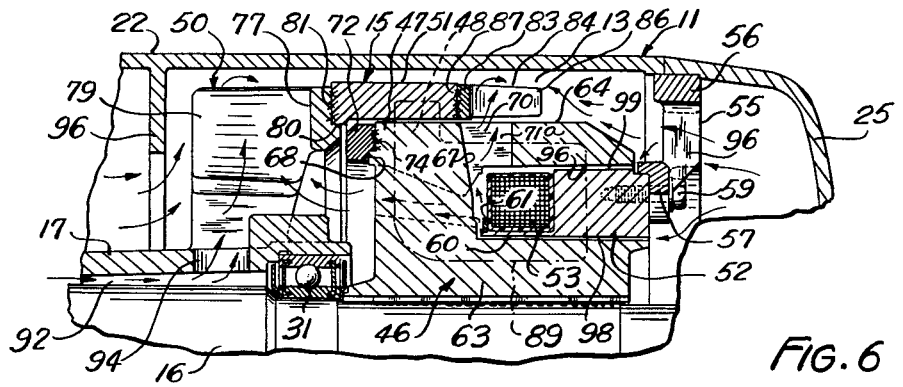
Figure 7:
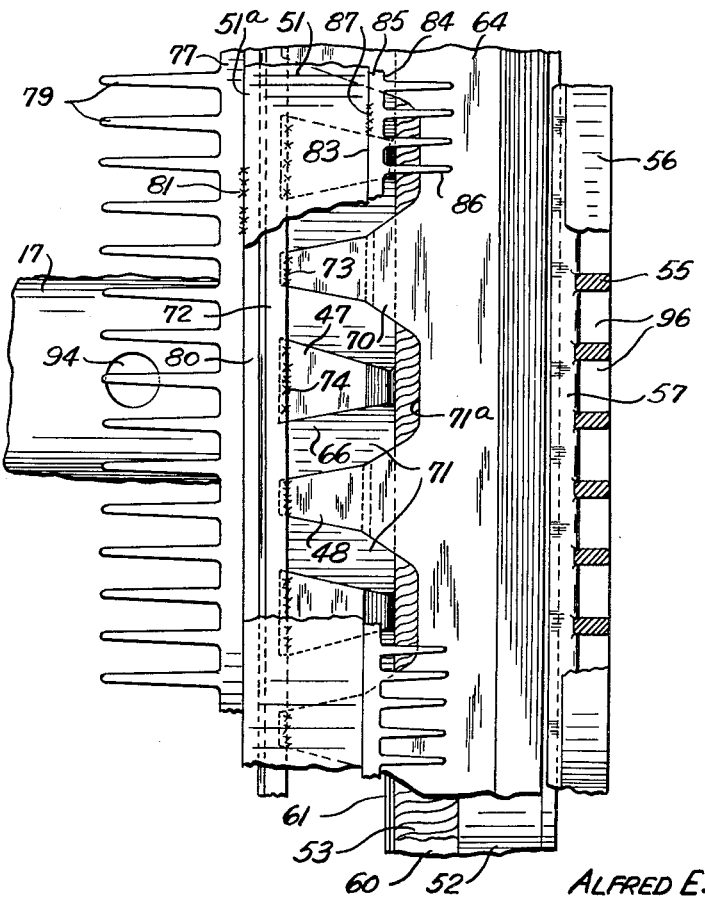

Other objects and advantages of this invention will be apparent in the following detailed description and in the accompanying drawings forming a part of this specification and in which, FIG. 1 is an elevational view, partly in longitudinal section, and showing a motor-drive coupling unit embodying this invention;

FIG. 2 is a vertical transverse section taken through the unit on section line 2—2 of FIG. 1 and looking toward the coupling section of the unit;

FIGS. 3, 4 and 5 are partial vertical transverse sections taken through the unit on section lines 3—3, 4—4 and 5—5 respectively of FIG. 1;

FIG. 6 is a partial longitudinal section corresponding with a portion of FIG. 1 but taken through the coupling section in a manner to further illustrate the construction thereof; and FIG. 7 is a partial development plan view of the coupling section of the unit.

The accompanying drawings show this invention embodied in a motor-drive coupling unit 10 comprising a housing 11 having a motor section 12 and a coupling section 13 therein in an axially adjacent relation. The motor section 12 contains an electric drive motor 14, and the coupling section 13 contains an electromagnetic coupling 15 through which the power output of the motor is delivered.

The unit 10 also comprises coaxial shaft members 16 and 17, of which the shaft member 16 is a power output shaft and the shaft member 17 is a hollow shaft or quill disposed in a surrounding relation to the shaft member 16 and forming the rotor shaft of the electric motor 14. The power output shaft 16 has end portions 18 and 19 projecting from the housing 11 and adapted for the connection of suitable power take-off members with one or both of these ends.

The housing 11 comprises an elongated stationary hollow body member 23 adapted to stand on a support or floor and end members or covers 24 and 25 connected with the ends of the body member by suitable connecting screws 26 and 27. Support bearings 29 and 30 of the antifriction type are provided in the covers 24 and 25 and rotatably support the shaft 16. An intermediate bearing 31 of the antifriction type is mounted on the shaft 16 at an intermediate point thereof and supports the inner end portion 32 of the hollow shaft 17.

The covers 24 and 25 are provided with air inlet openings 34 and 35 for admitting cooling air into the housing 11 at opposite ends thereof. The body member 22 is provided with suitable air outlet openings 36 and 37 in opposite sides thereof for the discharge of air from the housing 11. These air delivery openings are provided with louvered covers 38 and 39. The paths of flow of the cooling air within the housing 11 will be described hereinafter.

The electric drive motor 14 comprises co-operating stator and rotor members 41 and 42, of which the stator member is a laminated structure suitably mounted in the motor section 12 of the housing 11 and carries stator windings or coils 43. The rotor member 42 is likewise of a laminated construction and is suitably secured on the rotor shaft 17. The rotor member 42 is here shown as having an annular group of axially projecting air impelling blades 44 on the end thereof nearest the coupling 15.

The electromagnetic coupling 15 comprises a first or inner rotor 46 connected with the output shaft 16 and carrying an annular series of pole members 47 and 48 to be described hereinafter, and a second or outer rotor 50 connected with the inner end portion 32 of the hollow shaft 17 and carrying an inductor drum 51. The coupling 15 also comprises an annular field member 52 disposed in a surrounding coaxial relation to the shaft 16 and a portion of the inner rotor 46 and carrying an electrically energizable annular field coil 53.

The field member 52 is an annularly continuous hollow member, made of a suitable magnetic material such as a ferromagnetic material, and supported in a stationary relation in the housing 11 by a support ring or diaphragm member 55 of the latter. The diaphragm member 55 is here shown as having outer and inner ring portions 56 and 57, of which the outer ring portion 56 is secured to one end of the body member 22 by suitable attaching screws 58. The cover member 25 is connected with the body member 22 by being secured to the outer ring portion 56 by the above-mentioned connecting screws 27. The field member 52 is secured to the inner ring portion 57 in an axially projecting relation thereto by means of suitable attaching screws 59.

As shown in FIGS. 1 and 6, the field member 52 forms a support for the annular coil 53 and lies primarily on one axial side of such coil. The coil can be suitably supported on the field member 52 as by means of an axial projection or annular ledge portion 60 of the latter which is here shown as extending through the opening of the coil and as being of a relatively narrow thickness radially of the field member and coil. The coil 53 can be suitably retained on the axially projecting portion 60, as by means of a retaining ring 61 of the snap-ring type.

The inner rotor 46 has annular hub and rim portions or members 63 and 64 in radially spaced relation and lying on radially opposite sides of the field member 52. The hub and rim members 63 and 64 are annularly continuous hollow members made of a suitable magnetic material, such as a ferromagnetic material, and together with the field member 52 form portions of a flux path to be traversed by flux generated by the coil 53, as will be further explained hereinafter.

The hub member 63 is secured on the shaft 16 by means of a suitable key 65 and has substantially straight radiating arms 66 projecting outwardly therefrom and lying wholly on one axial side of the coil 53, that is, on the side of such coil opposite that on which the field member 52 is located. The outer radial ends of the arms 66 are of a tooth-like shape, as shown in the development view of FIG. 7, and form an annular group of the above-mentioned pole members 47.

The axial edges 67 of the arms 66, which are presented toward the coil 53, all lie in a common plane which is a substantially radially extending transverse plane perpendicular to the common rotation axis of the shafts 16 and 17. For a purpose which will be presently explained, the arms 66 are provided on their opposite axial edges with projecting lugs or shoulder elements 68 (see FIG. 6). The hub member 63 is also provided with an annular group of axially projecting blades 69 (see FIGS. 1 and 3) for air impelling purposes and which blades are formed integral with the arms 66 and are disposed in a radiating relation extending outwardly along the arms.

The rim member 64 has an annular group of axial projections or teeth 70 thereon whose free end portions form a second annular group comprising the above-mentioned pole members 48. The axial projections 70 are integral portions of the rim member 64 and have intervening spaces 71 therebetween, as shown in FIG. 7, into which the outer radial ends of the arms 66 project so as to locate the pole members 47 in a spaced and alternating relation to the pole members 48. The portions of the axial projections 70 which form the pole members 48 are of a relatively increased radial thickness so as to form inwardly extending enlargements 48ª on these pole members, as shown in FIG. 1, and which lie in an axially adjacent relation to the coil 53.

The rim member 64 includes a support ring 72 which is suitably secured to the free ends of the axial projections 70, as by means of welds 73, and forms an attachment means by which the rim member is mounted on the arms 66 of the hub member 63. The support ring 72 has portions thereof overlying and abutting against the shoulders 68 and is suitably secured to the arms 66 as by means of welds 74. The connections or welds 73 between the support ring 72 and the axial projections 70 of the rim member 64 thus lie between, and in alternating relation with, the welds 74 which connect this ring with the arms 60 as shown in FIG. 7.

From the construction of the inner rotor 46 as above described it will now be recognized that the hub and rim members 63 and 64, together with the arms 66 and the interdigitated pole members 47 and 48, define a toroidal magnetic circuit of a substantially C-shaped cross-section extending around the coil 53 as shown in FIGS. 1 and 6. The C-shaped section is disposed with the annular opening or gap 76 thereof facing axially toward the support ring portion 57 of the diaphragm member 55. It will now also be recognized that the annular coil 53 is located within the C-shaped section and is supported in this location by the annular field member 52 extending axially into the C-shaped section through the gap 76 thereof.

The outer rotor 50 has a support ring 77 which is connected with the end portion 32 of the hollow shaft 17 by radially projecting blade-like arms 78 of the latter. In addition to forming connecting members, the support arms 78 also form air impelling blades and, at spaced points between the arms 78, the rotor 50 is provided with additional radially disposed air impelling blades 79 which project in an axial direction from the support ring 77. The support ring 77 is provided with an axially projecting ledge portion 80 on the side thereof facing toward the coil 53.

The inductor drum 51 has an attached end 51ª which is secured to the support ring 77 in a surrounding engagement with the ledge 80, as by means of welds 81 located at spaced points around the rotor 50. The inductor drum 51 is an annularly continuous hollow member made of a suitable magnetic material, such as a ferromagnetic material, and has a free end portion 83 extending toward the coil 53.

The outer rotor 50 also includes a cooling means 84 in the form of a heat dissipating and air impelling means which is attached to the free end 83 and is rotatable with the inductor drum 15. The cooling means 84 comprises a ring portion 85 carrying an annular group of axially projecting blades 86 which are preferably formed integral with the ring portion.

In accordance with this invention, the cooling means 84 is made of a metal having a higher coefficient of heat conductivity than the metal of which the drum member 51 itself is made. The number 84 is preferably made of copper, although it can be made of copper alloy or any other suitable material having a coefficient of heat conductivity substantially greater than that of the inductor drum 51 and preferably at least as great as that of copper. The member 84 is connected with the free end 83 so that the ring portion 85 will be in a good heat-transfer relation to the inductor drum for the full annular extent of such free end and is preferably attached to the free end by junction means 87 formed by the use of silver solder or the like.

From the construction and arrangement described above for the inductor drum 51, it will now be recognized that this member extends in an axial overhanging or overlapping surrounding relation to the inner rotor 46 and that the overlapping portion of the inductor drum is of an axial length only sufficient to extend across and surround the support ring 72 and the annular groups of pole members 47 and 48. Because of this relatively short axial length for the inductor drum 51, it will be noted that the free annular edge or end portion 83 will lie substantially in the same radial plane as that which includes the axial edges 67 of the radiating arms 66, and hence, the annular group of blades 86 of the cooling means 84 will be in a surrounding relation to air passage means formed by portions of the intervening space between the co-operating portions of the hub and rim members 63 and 64. Thus, as shown in FIG. 7, portions of the intervening space 71 will provide radially-open slots 71ª extending in an annular series around the rim member 64 and around an exposed portion of the coil 53, and the blades 86 will move across these slots during relative rotation between the outer and inner rotors 50 and 46.

This location and arrangement for the blades 86 enables them to effectively produce an outward radial flow of cooling air through the slots 71ª and, since the cooling means 84 is made of a metal having a high coefficient of thermal conductivity and is in good heat-transfer engagement with the inductor rotor 51, the heat developed in the rotor will be readily transmitted to the cooling means and will be given up by the latter to the cooling air moving past the blades 86. This outward flow of cooling air through the space 71 and the slot portions 71ª thereof will be assisted by centrifugal force.

Because of the surrounding relation of the inductor drum 51 relative to the annular series of interdigitated pole members 47 and 48, the inductor drum co-operates with the latter by spanning the intervening portions of the space 71 and, together with the hub and rim portions 63 and 64 and the field member 52, completes the toroidal flux path extending around the coil 53 and represented by the dot-dash loop 89. Since the inductor drum 51 is of a relatively short axial length, it will present only a sufficient mass of ferromagnetic material to complete the flux path and there will be no excess quantity of metal to be traversed and heated by the flux. This will accordingly result in a more efficient transfer of driving torque through the electromagnetic coupling 15 with minimum power loss in generation of wasteful heat.

As already mentioned above, the housing 11 is provided at the ends thereof with the air inlet openings 34 and 35 for admitting cooling air to the housing. The air entering the housing through the opening 35 is received in the annular space 90 of the cover member 24 and flows through the opening of an annular baffle 91 into the motor section 12 of the housing. The hollow shaft 17 accommodates an axial flow of a portion of this cooling air through the annular space 92 therein and with which radial openings 93 and 94 communicate. Some of the cooling air flowing through the opening of the hollow baffle 91 passes through the air gap space 95 of the driving motor 14.

The portion of the cooling air which flows through the hollow shaft 17 emerges into the coupling section 13 through the radial openings 94. The portion of the cooling air which passes through the motor 14 enters the coupling section 13 through the opening of an intermediate baffle ring 96 of the housing 11 which is located adjacent the blades 44 of the rotor 42 of the drive motor.

Some of the cooling air entering the opposite end of the housing 11 through the openings 35 flows directly into the coupling section 13 through an annular series of radial openings 97 provided in the diaphragm member 55 and, in so doing, contacts and cools the rim member 64. Other portions of this cooling air flow into the annular recess of the C-shaped section through the intervening annular air gap spaces 98 and 99 between the field member 52 and the hub and rim members 63 and 64.

The flow of these streams of cooling air into the coupling section 13 from the inlet openings 34 and 35 of the housing is produced largely by the impelling action of the blades 78 and 79 of the outer rotor 50 but is assisted by blades 44 of the rotor 42 and the blades 69 of the hub member 63, as well as by the above-explained action of the blades 86. The action of the blades 78 and 79, as well as that of the blades 86, is to throw the air outward and eject it through the louvered discharge openings 36 and 37 of the housing. This outward movement of the air is assisted by centrifugal force acting on the air during the rotation of the rotors 46 and 50.

It will accordingly be seen that a very effective flow of cooling air will be achieved through the motor and coupling components 14 and 15 of the unit 10 and that an intimate contact of the cooling air with the co-operating portions of the coupling will be achieved. This effective flow of cooling air for the coupling 15 will be facilitated also by the fact that the inductor drum 51 is of a relatively short axial length, leaving a substantial portion of the intervening space 71 of the inner rotor 46 in an uncovered and radially-open condition.

The unit 10 is here shown as being also provided with an auxiliary alternating-current generating means 100 but, since this generating means forms no part of the present invention, it need not be described in detail.

From the accompanying drawings and the foregoing detailed description it will now be readily understood that this invention provides an electromagnetic coupling of a very practical and efficient form which can be used to advantage in motor-drive coupling units and in other power transmission applications. It will now also be understood that the novel electromagnetic coupling of this invention and the co-operating parts thereof are so constructed and arranged that the inductor drum is of a relatively short axial length for compactness and for the elimination of power loss which would otherwise occur in heating of an excess quantity of metal. Additionally, it will now be understood that the co-operating parts of the coupling are so disposed as to provide a large open-space area between the parts thereof for an effective flow of the cooling air therebetween, and that by the provision of a highly effective cooling means in a connected relation to the inductor drum, the heat developed in the latter will be rapidly dissipated.

Although the electromagnetic coupling of this invention has been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. In an electromagnetic coupling, a housing having support bearings therein, relatively rotatable coaxial shaft members operably supported in said housing by said bearings, an electrically energizable annular field coil, means supporting said coil including an annular field member lying primarily on one axial side of said coil, a first rotor connected with one of said shaft members and comprising annular hub and rim portions of magnetic material lying on radially opposite sides of said field member, annular groups of spaced projections carried by said hub and rim portions and having interdigitated pole portions lying wholly on the other axial side of said coil, the projections of said rim portion being axial projections and the projections of said hub portion being substantially straight radial projections, said interdigitated pole portions comprising free end portions of said axial and radial projections, and a second rotor connected with the other of said shaft members and having an axially projecting annularly continuous inductor drum portion extending toward said coil from said other side thereof and disposed in a surrounding and radially opposed relation to said interdigitated pole portions.

2. In an electromagnetic coupling, a housing having support bearings therein, relatively rotatable coaxial shaft members operably supported in said housing by said bearings, an electrically energizable annular field coil, means supporting said coil including an annular field member lying primarily on one axial side of said coil, a first rotor connected with one of said shaft members and comprising annular hub and rim portions of magnetic material lying on radially opposite sides of said field member, annular groups of spaced projections carried by said hub and rim portions and having interdigitated pole portions lying wholly on the other axial side of said coil, said rim portion having intervening recesses between the projections thereof and into which the projections of said hub portion extend, portions of said recesses forming an annular series of radially-open slots, a second rotor connected with the other of said shaft members and including an inductor drum surrounding said pole portions, said drum having an attached end connected with said second rotor and a free end extending toward said rim portion but spaced from the latter so as to leave said slots substantially uncovered, and ring means connected to said free end of said drum and including air-impelling blades disposed in an annular series surrounding said slots, said ring means being made of a different kind of metal than said drum and which different metal has a higher coefficient of heat conductivity than the metal of said drum.

3. In an electromagnetic coupling, a housing, first and second rotors supported in said housing for relative rotation about a common axis, a coaxial annular field member having an annular energizing coil thereon, said first rotor having coaxial annular hub and rim portions of magnetic material on radially opposite sides of said field member, said hub portion having radiating arms projecting therefrom and terminating in radially-straight free outer end portions forming one group of annularly spaced pole members, annularly spaced axial projections on said rim portion and terminating in axially-straight free end portions interdigitated between said outer end portions and forming another group of annularly spaced pole members, and a coaxial annularly continuous inductor drum connected with said second rotor and axially overlapping the adjacent end of said first rotor, said drum being of an axial overlap length only sufficient to overlie and surround the portion of the first rotor comprising the groups of pole members formed by said interdigitated free-end portions.

4. In an electromagnetic coupling, a housing having support bearings therein, relatively rotatable coaxial shaft members operably supported in said housing by said bearings, an annular field member having an energizable field coil thereon, a first rotor connected with one of said shaft members and comprising annular hub and rim portions of magnetic material lying on radially opposite sides of said field member, annular groups of spaced pole members connected respectively with said hub and rim portions and disposed with the pole members of one group in an interdigitated relation to the pole members of the other group, said hub portion having substantially straight radiating arms and the pole members of one of said groups being formed by the outer radial ends of said arms, a second rotor connected with the other of said shaft members and having an annular inductor drum portion extending around said groups of pole members, said housing having air inlet and outlet openings and said rim and drum portions having adjacent annularly extending edge portions lying in axially spaced radial planes to provide therebetween a radially-facing annular air passage means, said drum portion being axially offset from said coil and having an axial overlap length only sufficient to overlie and surround said outer radial ends so as to leave said annular air passage means substantially uncovered, and air-impelling blade means on the adjacent annular edge portion of said drum portion to cause a flow of cooling air through said openings and annular air passage means, said blade means being made of a different kind of metal than said drum portion and which different metal has a higher coefficient of heat conductivity than the metal of said drum portion.

5. In an electromagnetic coupling; a housing having bearing means therein; relatively rotatable coaxial shaft members supported by said bearing means; an annular field member connected with said housing and supporting an annular energizing coil; an annular hub member connected with one of said shaft members and having radiating arms terminating in radially-straight outer ends forming a group of annularly spaced pole members; support ring means connected with said arms adjacent said outer ends; an annular rim member having axial teeth projecting therefrom; said hub and rim members being of magnetic material and lying on radially opposite sides of said field member; the end portions of said teeth being interdigitated between said outer ends to form a second group of annularly spaced pole members and being connected with said ring means for supporting said rim member; adjacent portions of said rim member and arms being in a spaced relation to form radially-facing air passage means; a rotor connected with another of said shaft members and having an annularly continuous axial inductor drum portion surrounding said groups of pole members; said drum portion having an axial overlap length only sufficient to extend across said ring means, said outer ends and said interdigitated end portions so as to leave said air passage means substantially uncovered; and an annular series of air-impelling blades on said drum portion and located in surrounding relation to said air passage means for inducing a flow of cooling air therethrough.

6. An electromagnetic coupling as defined in claim 5 wherein said field member lies primarily on one axial side of said coil and said arms lie wholly on the other axial side of said coil; and wherein said ring means is connected with said arms on the side thereof remote from said coil.

7. In an electromagnetic coupling, a first rotor means comprising connected annular members having co-operating portions defining a toroidal flux path of a substantially C-shaped cross-section and including annular groups of interdigitated pole members, said co-operating portions having spaces therebetween forming annular air passage means providing for an outward radial flow of cooling air from the interior of the C-shaped toroidal section, a stationary annular member extending into said C-shaped toroidal section and supporting an annular energizing coil therein, a second rotor means having a common rotation axis with the first rotor means and including an annularly continuous ferromagnetic inductor drum portion projecting axially therefrom and surrounding said interdigitated pole members, said drum portion having a free end and being of an axial length in relation to the axial dimension of said pole members so that the location of said free end leaves a substantial portion of said annular air passage means uncovered, and ring means attached to said free end and providing an annular series of air-impelling blades surrounding the uncovered portion of said air passage means for producing said flow of cooling air, said ring means being made of a different kind of metal than said drum portion and which different metal has a higher coefficient of heat conductivity than the metal of said drum portion.

8. An electromagnetic coupling as defined in claim 7 wherein said first rotor has radiating arms lying wholly on one axial side of said coil and one group of said pole members is formed by the outer radial ends of said arms, and wherein said free end of said drum portion lies substantially in a common radial plane with the axial edges of said arms which are presented toward said coil.

9. In an electromagnetic coupling, a first rotor means comprising connected annular members having co-operating portions defining a toroidal flux path of a substantially C-shaped cross-section and including annular groups of interdigitated pole members, said co-operating portions having spaces therebetween forming annular air passage means providing for an outward radial flow of cooling air from the interior of the C-shaped toroidal section, a stationary annular member extending into said C-shaped toroidal section and supporting an annular energizing coil therein, a second rotor means having a common rotation axis with the first rotor means and including an annularly continuous ferromagnetic inductor drum portion projecting axially therefrom and surrounding said interdigitated pole members, said drum portion having a free end and being of an axial length in relation to the axial dimension of said pole members so that the location of said free end leaves a substantial portion of said annular air passage means uncovered, and ring means attached to said free end and providing an annular series of air-impelling blades surrounding the uncovered portion of said air passage means for producing said flow of cooling air, said ring means being made of a metal having a heat conductivity at least equal to that of copper.

References Cited in the file of this patent
UNITED STATES PATENTS 2,817,029    Jaeschke _____ Dec. 17, 1957